(12) United States Patent
Williams et al.

(10) Patent No.: US 12,418,167 B2
(45) Date of Patent: Sep. 16, 2025

(54) VOLTAGE CUTOFF SYSTEM

(71) Applicant: Relyion Energy Inc., Fremont, CA (US)

(72) Inventors: Kurt Fanuka Williams, San Diego, CA (US); Surinder Singh, Fremont, CA (US); Ratnesh K. Sharma, Fremont, CA (US)

(73) Assignee: Relyion Energy Inc., Fremont, CA (US)

( * ) Notice: Subject to any disclaimer, the term of this patent is extended or adjusted under 35 U.S.C. 154(b) by 115 days.

(21) Appl. No.: 18/322,043

(22) Filed: May 23, 2023

(65) Prior Publication Data

US 2024/0396321 A1    Nov. 28, 2024

(51) Int. Cl.
    *H02H 3/20*    (2006.01)
    *H02H 1/00*    (2006.01)

(52) U.S. Cl.
    CPC ............ *H02H 3/20* (2013.01); *H02H 1/0007* (2013.01)

(58) Field of Classification Search
    CPC ................................ H02H 3/20; H02H 1/0007
    See application file for complete search history.

(56) References Cited

U.S. PATENT DOCUMENTS

| | | | | |
|---|---|---|---|---|
| 5,216,284 | A  * | 6/1993 | Mattes .................... | H02J 9/061 340/436 |
| 2005/0007711 | A1 * | 1/2005 | Liu ........................ | H02H 3/202 361/90 |
| 2016/0072322 | A1 * | 3/2016 | Yoshimatsu ............ | H02H 7/18 361/86 |
| 2019/0391627 | A1 * | 12/2019 | Chavali ............... | G06F 13/4282 |
| 2021/0367383 | A1 * | 11/2021 | Dhanasekaran ....... | H02H 9/041 |

* cited by examiner

*Primary Examiner* — Scott Bauer
(74) *Attorney, Agent, or Firm* — Morrison & Foerster LLP (57) ABSTRACT

Systems and methods for controlling energy provided from a battery to a system are disclosed. In some embodiments, the system comprises a voltage cutoff system, and the method comprises steps for operating the voltage cutoff system. In some embodiments, the method comprises receiving a signal associated with the battery's voltage and determining whether the signal is between two threshold voltages. In accordance with a determination that the signal is not between the two threshold voltages (e.g., indicating that the battery's voltage is out of an operating voltage range), the method comprises outputting a latched signal for controlling the battery. For example, the latched signal causes the battery to cease providing power to the system (e.g., cutoff). In some embodiments, in response to receiving an override input, the latched signal causes the battery to continue providing power to the system.

20 Claims, 5 Drawing Sheets

VOLTAGE CUTOFF SYSTEM

FIELD

This disclosure generally relates to voltage cutoff systems and methods for operating voltage cutoff systems.

BACKGROUND

Some voltage cutoff systems may have a limited voltage operating range and may sometimes cutoff at a specified voltage. Some voltage cutoff systems may have a high cutoff voltage and a low cutoff voltage but may not have a power off mode, so they may continuously draw energy and/or may not reengage after a corresponding system is power cycled. Some voltage cutoff systems may use an integrated circuit to sense a battery voltage and to control a relay to turn on/off a corresponding system. However, the relays may be integrated to the voltage cutoff system and may be less configurable. An integrated relay may limit the maximum power a corresponding system can deliver.

SUMMARY

Systems and methods for controlling energy provided from a battery to a system are disclosed. In some embodiments, the system comprises a voltage cutoff system, and the method comprises steps for operating the voltage cutoff system. In some embodiments, the method comprises receiving a signal associated with the battery's voltage and determining whether the signal is between two threshold voltages. In accordance with a determination that the signal is not between the two threshold voltages (e.g., indicating that the battery's voltage is out of an operating voltage range), the method comprises outputting a latched signal for controlling the battery. For example, the latched signal causes the battery to cease providing power to the system (e.g., cutoff). In some embodiments, in response to receiving an override input, the latched signal causes the battery to continue providing power to the system.

DETAILED DESCRIPTION

In the following description of embodiments, reference is made to the accompanying drawings which form a part hereof, and in which it is shown by way of illustration specific embodiments which can be practiced. It is to be understood that other embodiments can be used and structural changes can be made without departing from the scope of the disclosed embodiments.

Figure 1A:
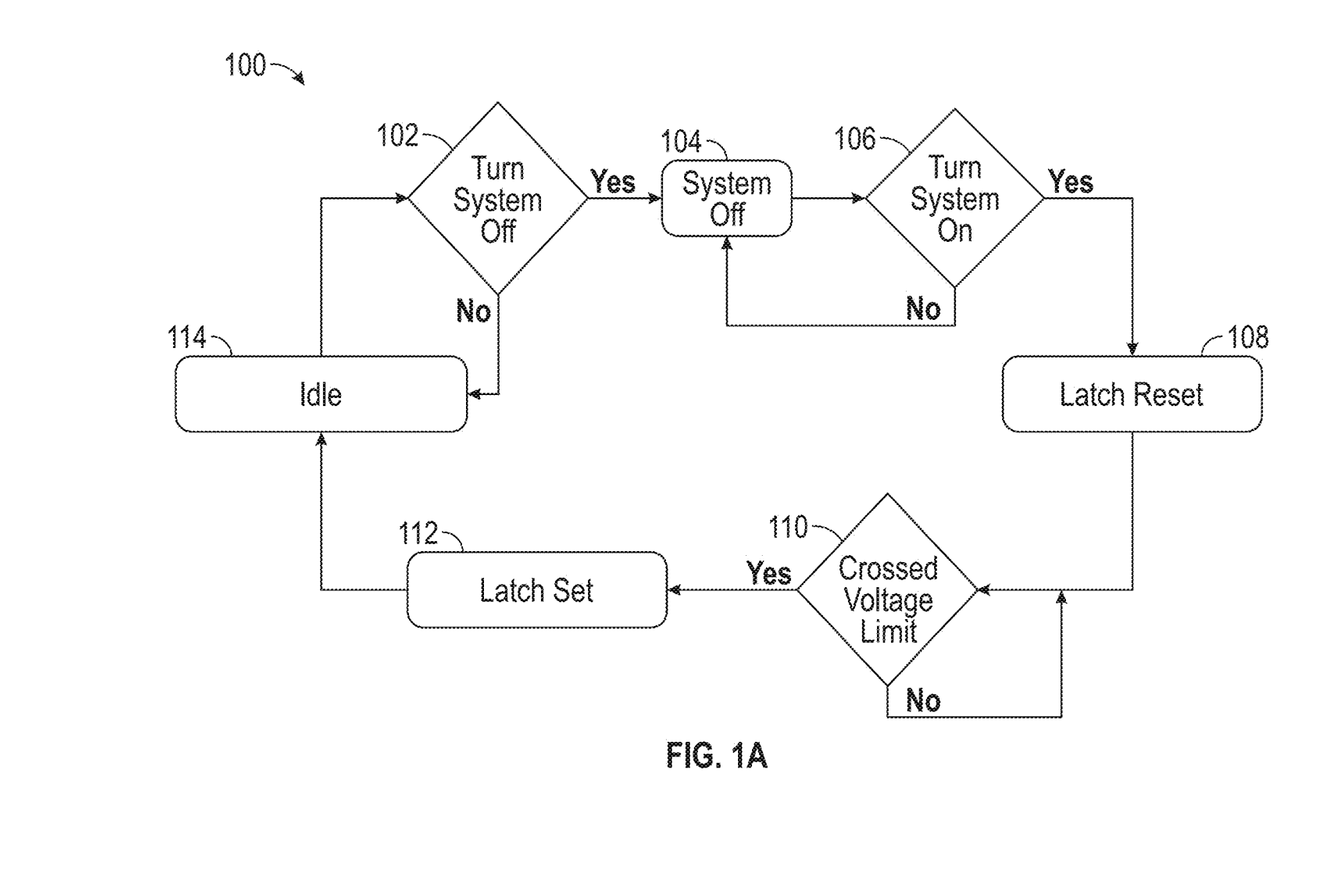
FIG. 1A illustrates a diagram for operating an exemplary system, in accordance with embodiments of this disclosure.

FIG. 1A illustrates a diagram 100 for operating an exemplary system, in accordance with embodiments of this disclosure. In some embodiments, the diagram 100 illustrates exemplary steps for operating a voltage cutoff system disclosed herein.

In some embodiments, the diagram 100 includes step 102, turning a system off. For example, the voltage cutoff system is configured to control a battery for powering a system, and the system is turned off (e.g., by ceasing providing energy to the system in response to an input (e.g., from a user, from another system, from the system itself) to the system).

In some embodiments, the diagram 100 includes step 104, the system being turned off. For example, in response to step 102, the system 104 is turned off (e.g., no energy is provided to cause the system to perform the system's normal operations).

In some embodiments, the diagram 100 includes step 106, turning the system on. For example, the system is turned on by providing energy to system in response to an input (e.g., from a user, from another system, from the system itself) to the system, causing the system to perform its normal operations. Steps 102 to 106 may be called "power cycling" the system.

In some embodiments, the diagram 100 includes step 108, resetting a latch. For example, the voltage cutoff system comprises a latch, and in response to the system turning on (e.g., at step 106), the latch resets. After the latch resets, an input to the latch may cause an output of the latch to change.

In some embodiments, the diagram 100 includes step 110, determining whether a voltage of the battery crosses a voltage limit. For example, this determination comprises a determination of whether the battery voltage is out of an operating voltage range. As discussed in more detail herein, the voltage cutoff system advantageously allows battery control based on two different cutoff voltages that may be adjusted based on an application of the battery, allowing the voltage cutoff system to be compatible with more applications.

As discussed in more detail herein, the determination of whether a voltage of the battery crosses a voltage limit may comprise determining whether a signal voltage associated with the battery voltage (e.g., a scaled down version of the battery voltage) is between a first threshold voltage and a second threshold voltage.

In some embodiments, the diagram 100 includes step 112, in accordance with a determination that the voltage of the battery crossed the voltage limit, setting the latch. For example, in accordance with the determination that the battery voltage is outside the operating voltage range, an input (e.g., a logic high input) is provided to the latch, setting the latch and causing the latch to output a latched signal. After the latch is set, an input to the latch may not cause an output of the latch to change until the latch is reset. In some embodiments, in accordance with a determination that the battery voltage is outside the operating voltage range, the system generates an alert indicating that the battery voltage is outside the operating voltage range. In some embodiments, the alert is transmitted to a user or to another electronic device.

As described in more detail herein, the latched signal may control energy provided by the battery to the system. For example, the latched signal may be provided to a switch, and this causes the switch to cause ceasing providing the energy, continuing providing the energy, or changing how the energy is provided.

The latch may advantageously allow the system to remain off until the system is powered cycled, minimizing power consumption for operations associated with voltage cutoff. For example, the latched signal allows power consumption reduction while the battery ceases providing energy to the system, compared to other voltage cutoff systems.

It may be desirable for the system to not reengage after the battery voltage is outside an operating voltage range. For example, the battery voltage may change after the battery ceases providing energy to the system, and reengaging the system in this scenario may cause degradation to the battery and/or the system. The latched signal may advantageously ensure that the system does not reengage until after the system is power cycled, reducing degradation to the battery and the system.

Furthermore, the latched signal may allow generation of a control signal for different applications. For example, a positive-triggered or a negative-triggered signal (e.g., for ceasing providing energy to the system) may be generated based on the latched signal. As another example, two or more control signals (e.g., a positive-triggered and a negative-triggered signal, a signal and its inverse) may be generated based on the latched signal. This may allow the disclosed voltage cutoff system to control an active high and/or active low relay. This may also allow multiple relays to be controlled at once and an ability to turn on one or more of the multiple relays according to an application.

In some embodiments, the diagram 100 includes step 114, idling. For example, while the system is idling, the system remains at a state caused by the latched signal (e.g., battery ceasing providing energy to the system, battery continuing providing energy to the system, battery providing energy to the system in an updated manner caused by the latched signal). In some embodiments, the system continues to idle until it is power cycled (e.g., performing steps 102 to 106).

In some instances, it may be desirable for a voltage cutoff system to have an override functionality, which may allow the battery to continue providing energy to the system despite the battery voltage being out of an operating range. The override functionality may allow the system to be brought back to the operating range while reducing interventions needed to restore the system voltage, compared to a voltage cutoff system without an override functionality. For example, without the override functionality, the voltage cutoff system may need to be disconnected and a corresponding relay may need to be manually turned on to bring the system back into operating range. Reducing interventions may be advantageous in situations where the system and/or the battery are more difficult to access (e.g., in a remote location, away from the grid), allowing a user to bring the system back into operating range while the system remains on. In some embodiments, when the battery ceases providing energy to the system, the system is powered via solar-generated energy. For example, if the battery voltage is below the first threshold voltage, the user can charge the battery to a higher voltage, and if the battery voltage is above the second threshold voltage, the user can discharge the battery to a lower voltage.

Figure 1B:
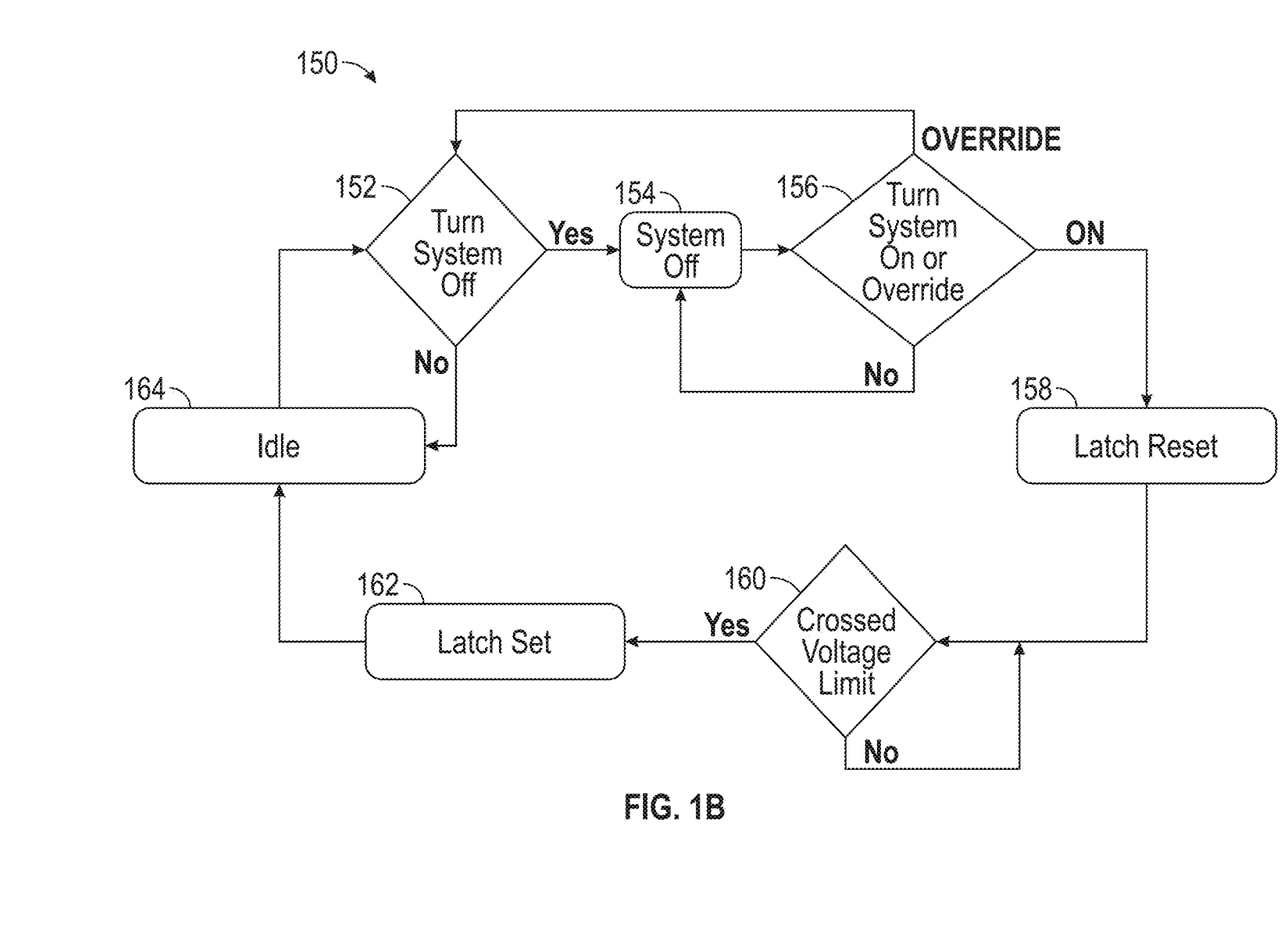
FIG. 1B illustrates a diagram for operating an exemplary system, in accordance with embodiments of this disclosure.

FIG. 1B illustrates a diagram 150 for operating an exemplary system, in accordance with embodiments of this disclosure. In some embodiments, the diagram 150 illustrates exemplary steps for operating a voltage cutoff system disclosed herein. It should be appreciated that some steps of diagram 150 are described with respect to some steps of diagram 100. For example, step 152 may correspond to step 102, step 154 may correspond to step 104, step 158 may correspond to step 108, step 160 may correspond to step 110, step 162 may correspond to step 112, and step 164 may correspond to step 114. For brevity, some features and advantages associated with these steps are not described here.

In some embodiments, the diagram 150 includes step 156, turning the system on and determining whether an override input is received. For example, the system is turned on by providing energy to system in response to an input (e.g., from a user, from another system, from the system itself) to the system, causing the system to perform its normal operations. Step 152, step 154, and the step of turning on the system may be called "power cycling" the system.

In some embodiments, in accordance with a determination that the override input is received (e.g., via an input (e.g., from a user, from another system, from the system itself)), via a system input), the voltage cutoff system is configured to allow the battery to continue providing energy to the system. For example, even if the battery voltage is determined to be out of an operating voltage range, the latched signal would not cause the battery to cease providing energy to the system, achieving the advantages associated with the override mode described above. As another example, if the override input is received, the system would operate independent of the battery voltage, as if the voltage cutoff system is not coupled to the system, as illustrated in FIG. 1B and step 156.

In some embodiments, in accordance with a determination that the override input is not received, the voltage cutoff system operates as described with respect to diagram 100. For example, if the battery voltage is determined to be out of an operating voltage range, the latched signal would cause the battery to cease providing energy to the system.

Figure 2:
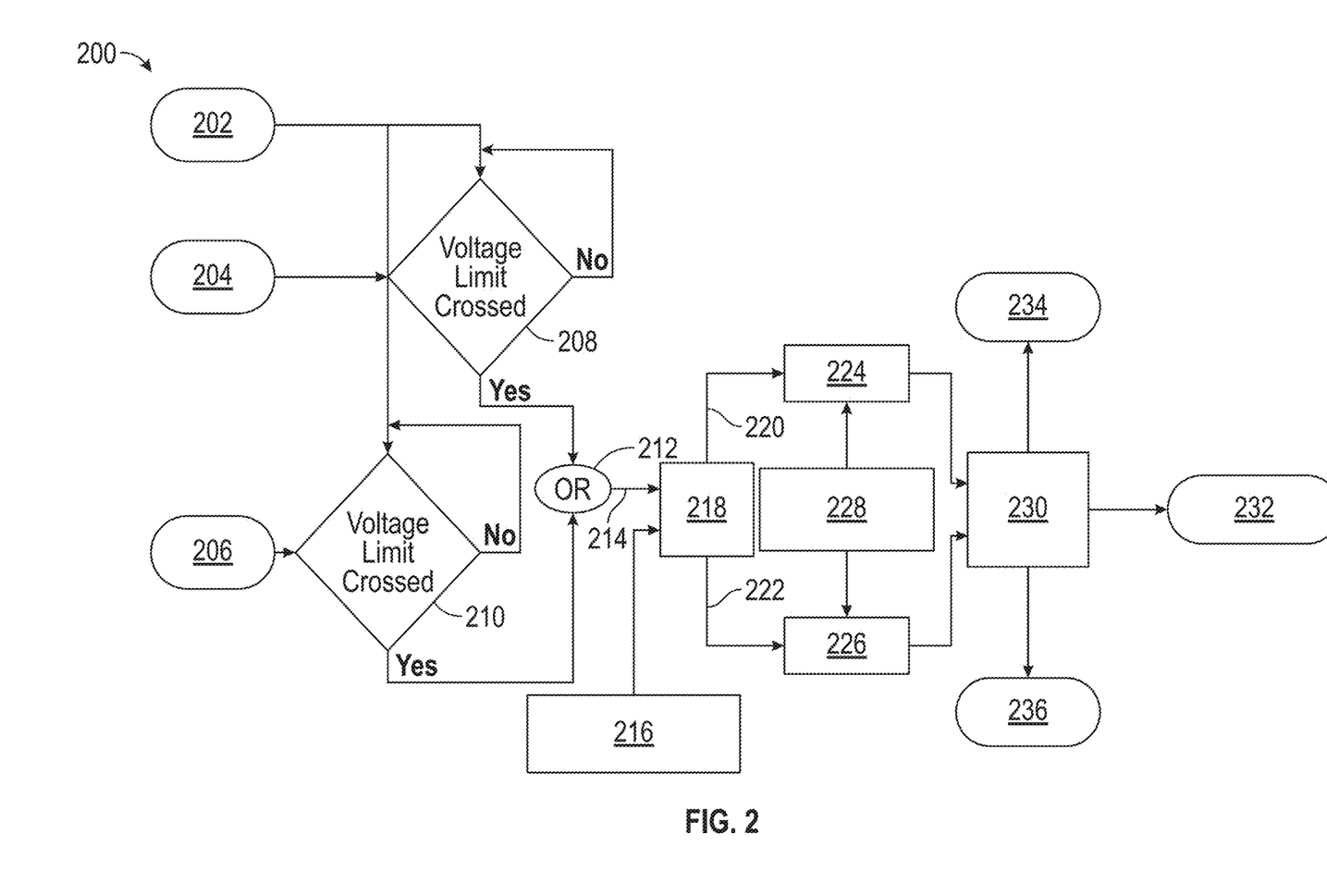
FIG. 2 illustrates a diagram for operating an exemplary system, in accordance with embodiments of this disclosure.

FIG. 2 illustrates a diagram 200 for operating an exemplary system, in accordance with embodiments of this disclosure. In some embodiments, the voltage cutoff system comprises comparators (not shown) for determining whether a signal 202 is between a first reference voltage 204 and a second reference voltage 206 by determining whether the signal 202 is above the first reference voltage 204 (step 208) and whether the signal 202 is below the second reference voltage 206 (step 210). In some embodiments, the signal 202 is associated with the battery voltage (e.g., the signal 202 is a scaled down version of the battery voltage). Conversely, the comparators may be used to determine whether the signal 202 is not between the first reference voltage 204 and the second reference voltage 206 (indicating that the battery voltage is out of an operating voltage range) by determining whether the signal 202 is below the first reference voltage 204 (step 208) or whether the signal 202 is above the second reference voltage 206 (step 210).

In some embodiments, as illustrated, the voltage cutoff system comprises OR logic 212 and latch 218. For example, the OR logic 212 comprises an OR logic gate, and the latch 218 comprises an SR latch. In accordance with a determination that the signal 202 is below the first reference voltage 204 (step 208) or that the signal 202 is above the second reference voltage 206 (step 210) (indicating that the battery voltage is out of an operating range), the OR logic 212 outputs a logic high signal 214 to the latch 218 for setting the latch 218. It should be appreciated that the logic high signal may be any voltage level indicating that the OR condition is satisfied.

In some embodiments, prior to the setting of the latch 218, the latch was reset by reset circuit 216, which is configured to provide a signal to the latch 218 for resetting the latch 218. In some embodiments, in response to the system being power cycled, the reset circuit 216 is configured to provide the signal for resetting the latch 218. The reset circuit 216 may provide this signal without an external input, advantageously allow this signal to be self-generated in response to a power cycle. The reset circuit 216 may reduce a need for an external input for initiating the generation of the reset signal, which may be advantageous in situations where the system is more difficult to access (e.g., in a remote location, away from the grid). In some embodiments, the latched signal causes ceasing of energy provided to the system, and the energy may not be provided again until the latch is reset.

In some embodiments, the voltage cutoff system comprises switches 224 and 226 coupled to outputs of the latch 218 and relay voltage 228. For example, switches 224 and 226 are transistors connected to a non-inverted (e.g., Q output of an SR latch) and inverted output (e.g., $Q_{inv}$ output of an SR latch) of latch 218, and each of the transistors is configured to pass the relay voltage 228 if it is turned on by a respective signal from the latch 218.

In some embodiments, the voltage cutoff system comprises switch 230. For example, the switch 230 is a three-position switch (e.g., a CAM switch). A CAM switch may be more intuitive for a user to select a desirable position and may allow the voltage cutoff system to be configured without physically reconnecting components. As an example, a zeroth position 232 of the switch corresponds to a no connection (e.g., and resetting the system or turning the system off), a first position 234 of the switch corresponds to a high output (e.g., for causing the battery (via a positive trigger) to cease providing energy to the system; Q output of the SR latch), and a second position 236 of the switch corresponds to a low output (e.g., for causing the battery (via a negative trigger) to cease providing energy to the system; $Q_{inv}$ output of the SR latch). A position of the switch may be selected in response to an input (e.g., from a user, from the system, from another device). It should be appreciated that the voltage cutoff system may comprise a switch having less than or more than three positions. It should also be appreciated that the positions of a switch may correspond to different features than described.

In some embodiments, using the CAM switch, the system can be reset to start charging if the battery voltage is below a lower threshold voltage (e.g., the first threshold voltage), or the system can be reset to start discharging if the battery voltage is above than a higher threshold voltage (e.g., the second threshold voltage).

In some embodiments, the switch 230 is configured to cause the battery to cease providing energy to the system (e.g., cutoff) in response to receiving a latched signal. In some embodiments, the switch 230 is configured to cause the battery to continue providing energy to the system in response to the system receiving an override input (even if a latched signal is received). For example, the switch 230 comprises three positions—the zeroth position causes ceasing of energy provided to the system, the first position causes energy to be provided to the system, and the second position corresponds to the override input. An override input may cause the switch 230 to be in the second position, and the switch 230 causes the battery to continue providing energy to the system (e.g., overriding a voltage cutoff operation).

In some embodiments, the components of the voltage cutoff system are mounted on a printed circuit board and does not include a microprocessor. The disclosed voltage cutoff system may less likely experience functional failures because it operates without a microprocessor. It may be less reliable to use a microprocessor for voltage cutoff because the microprocessor may more likely crash and cause functional failures, compared to the non-processor and non-integrated circuit components of the disclosed voltage cutoff system. The disclosed voltage cutoff system's higher reliability may be advantageous in situations where the system is more difficult to access (e.g., in a remote location, away from the grid) for mitigating functional failures.

Figure 3:
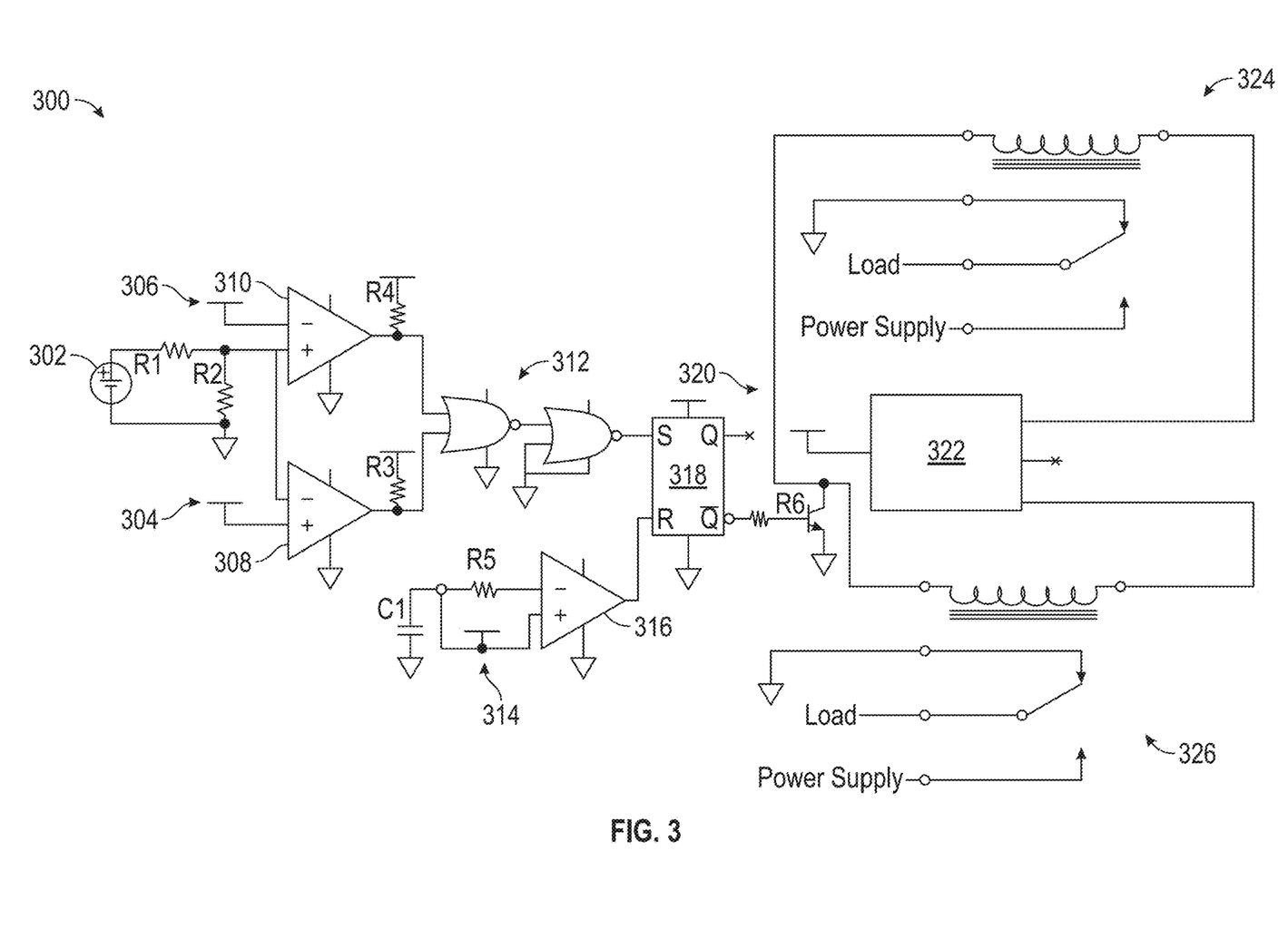
FIG. 3 illustrates an exemplary system, in accordance with embodiments of this disclosure.

FIG. 3 illustrates an exemplary voltage cutoff system 300, in accordance with embodiments of this disclosure. The voltage cutoff system 300 may be an example of voltage cutoff systems described with respect to FIGS. 1A, 1B, and 2. In some embodiments, the voltage cutoff system 300 comprises a first comparator 308, a second comparator 310, an OR gate 312, a latch 318, and a switch 320. The components of the voltage cutoff system 300 may be mounted on a printed circuit board and does not include a microprocess, achieving the advantages described above.

In some embodiments, the first comparator 308 is associated with a first threshold voltage (e.g., reference voltage 304), and a negative terminal of the first comparator 308 is configured to receive a signal associated with a voltage of the battery 302, as illustrated. In some embodiments, a voltage of the battery 302 is 20-480V.

In some embodiments, a state of health of the battery is 30% to 95%. For example, the battery is a repurposed battery (e.g., a battery that formerly provided energy to an electric vehicle) having a lower state of health which may more likely venture out of operating voltage range, and the voltage cutoff system may advantageously allow the repurposed battery to provide energy to a system while reducing potential damage to the system caused by the battery operating out of voltage range.

In some embodiments, the second comparator 310 is associated with a second threshold voltage (e.g., reference voltage 306). A positive terminal of the second comparator 310 is configured to receive the signal associated with the voltage of the battery 302, as illustrated. In some embodiments, the first threshold voltage is lower than the second threshold voltage. In some embodiments, the reference voltage 304 and reference voltage 306 are provided by voltage regulators. In some embodiments, voltages provided by the voltage regulators are adjustable.

In some embodiments, the signal associated with the voltage of the battery 302 is generated via resistor divider comprising resistors R1 and R2, advantageously allowing the voltage cutoff system to be compatible with a wider voltage range. The resistor divider advantageously scales down the battery voltage to a level compatible with components of the voltage cutoff system and reducing power consumption for performing voltage cutoff. In some embodiments, the resistances of R1 and R2 are between 1 kiloohm to 20 kiloohms, which may advantageously reduce current flow and power consumption for generating the signal to the comparators. In some embodiments, resistors R1 and R2 are precision resistors having a 0.1% or less tolerance. In some embodiments, resistors R1 and R2 have temperature coefficients 10 ppm/C to 50 ppm/C.

For example, the battery voltage may be scaled down by a factor of 15. If an operating range of the battery is between 90V and 120V, the resistor divider is configured to generate a signal scaled down by a factor of 15 from the battery voltage. That is, the ratio between R1 and R2 would be 14 to 1 in this example (e.g., R1 is 14 kiloohms and R2 is 1 kiloohm). In this example, the first threshold voltage would be 6V (e.g., reference voltage 304) and the second threshold voltage would be 8V (e.g., reference voltage 306).

Ins some embodiments, the resistors R1 and/or R2 are adjustable to adjust the factor for scaling down the battery voltage to generate the signal for the comparators. For example, one or more of R1 and R2 comprises variable resistors. In some embodiments, the resistors R1 and/or R2 may be replaced by one or more resistors having a different resistance to achieve a different factor. In some embodiments, the voltage regulators for providing the reference voltages are adjustable. The adjustable resistor divider and/or the voltage regulators may advantageously allow the voltage cutoff system to be compatible with greater battery operating ranges (e.g., to accommodate a magnitude of the signal received by the comparators).

In some embodiments, the OR gate 312 is configured to receive an output of the first comparator 308 and an output of the second comparator 310. It should be appreciated that the OR gate 312 may comprise different components than illustrated for performing the OR logic operation.

In some embodiments, the latch 318 comprises a first input and a second input. The first input is configured to receive an output of the OR gate, and the second input is configured to receive an output of a reset circuit 314. For example, the latch 318 is an SR latch. The first input is the set input of the SR latch, and the second input is the reset input of the SR latch.

In some embodiments, the reset circuit 314 comprises an RC circuit (e.g., capacitor C1 and resistor R5) and a comparator 316. As illustrated, a negative terminal of the comparator 316 is coupled to the resistor R5 and the positive terminal of the comparator 316 is coupled to a power supply. In some embodiments, in response to the system start up (e.g., during power cycling, steps 102 and 104), the power supply voltage decreases and causes the RC circuit to discharge. After power cycling completes, the power supply increases back to an operating level, causing the output of the comparator 316 to output a logic high signal and the RC circuit to charge. The logic high signal is provided to the reset input of the SR latch and resets the SR latch. Once the RC circuit is charged, the inputs of the comparator 316 are equal, causing the output of the comparator 316 to output a logic low signal. For example, the RC circuit causes the comparator 316 to output a pulse for resetting the latch, such that a width of the pulse is associated with the time constant of the RC circuit (e.g., 63% of the pulse width is the time constant). In some embodiments, the latched signal causes ceasing of energy provided to the system, and the energy may not be provided again until the latch is reset.

In some embodiments, the switch 320 is coupled to an output of the latch 318. For example, as illustrated, the switch 320 is coupled to the $Q_{inv}$ output of the SR latch. Although the Q output of the SR latch is not coupled to a component in FIG. 3, it should be appreciated that the Q output of the SR latch may be coupled to a component (e.g., a second switch coupled to additional relays) for controlling how energy is provided to a system.

In some embodiments, the switch 320 comprises transistor R6 and a three-position position (e.g., a CAM switch 322). In some embodiments, the switch 320 is configured to cause the battery to cease providing energy to the system (e.g., cutoff) in response to receiving a latched signal. In some embodiments, the switch 320 is configured to cause the battery to continue providing energy to the system in response to the system receiving an override input (even if a latched signal is received). For example, the switch 320 comprises three positions—the zeroth position causes ceasing of energy provided to the system, the first position causes energy to be provided to the system, and the second position corresponds to the override input. An override input may cause the switch 320 to be in the second position, and the switch 320 causes the battery to continue providing energy to the system (e.g., overriding a voltage cutoff operation).

A position of the CAM switch 322 may be configured in response to receiving an input (e.g., from a user, from the system). As illustrated in the example, a zeroth position of the CAM switch 322 comprises an open circuit, corresponding to an "off" state when no energy is provided to the system. A first position of the CAM switch 322 is coupled to first relay 324, which may be configured to discharge the battery when this position is selected. For example, when $Q_{inv}$ output provides a logic high signal (e.g., when the latch is reset), transistor R6 is turned on and allows a current to flow via first relay 324, allowing the battery to discharge. A second position of the CAM switch 322 is coupled to second relay 326, which may be configured to charge the battery when this position is selected. For example, when the $Q_{inv}$ output provides a logic high signal (e.g., when the latch is reset), transistor R6 is turned on and allows a current to flow via second relay 326, allowing the battery to charge. In this example, when the $Q_{inv}$ output provides a logic low signal (e.g., when the latch is set), transistor R6 is turned off and ceases current through the switch 320. In some embodiments, the relays 324 and 326 are configured to accommodate a load requirement based on components coupled to the relays (e.g., the battery).

It should be appreciated that the voltage cutoff system may comprise a switch having less than or more than three positions. It should also be appreciated that the positions of a switch may correspond to different features than described.

Figure 4:
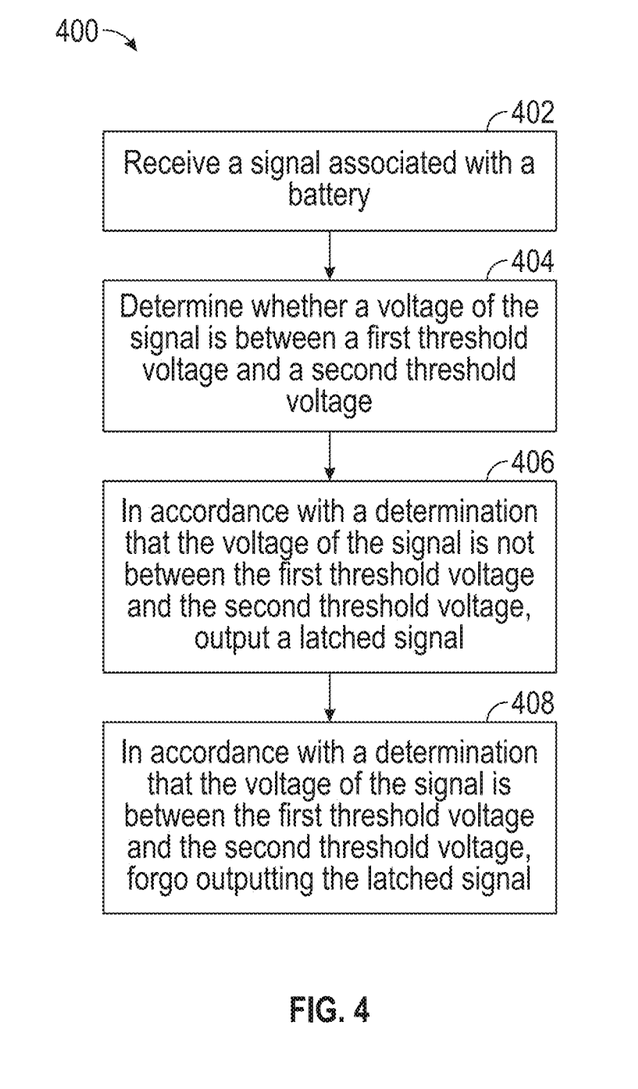
FIG. 4 illustrates an exemplary method for operating a system, in accordance with embodiments of this disclosure.

FIG. 4 illustrates an exemplary method 400, in accordance with embodiments of this disclosure. In some embodiments, the method 400 comprises steps for operating a disclosed voltage cutoff system, for example, described with respect to FIGS. 1-3. It should be appreciated that the steps of method 400 leverage features and advantages described with respect to FIGS. 1-3.

In some embodiments, the method 400 comprises receiving a signal associated with a battery (step 402). For example, as described with respect to FIG. 2, signal 202 is received. As another example, as described with respect to FIG. 3, a signal is received by the comparators 308 and 310.

In some embodiments, the voltage of the signal is a fraction of the voltage of the battery. For example, as described with respect to FIG. 3, the voltage of the signal is $\frac{1}{15}$ of the battery voltage. In some embodiments, the fraction is associated with a resistor divider. For example, as described with respect to FIG. 3, the voltage cutoff system comprises a resistor divider for generating the signal. In some embodiments, the resistor divider comprises resistors having temperature coefficients of 10 ppm/C to 50 ppm/C. In some embodiments, the resistor divider comprises resistors having resistances of 1 kiloohm to 20 kiloohms.

In some embodiments, the method 400 comprises determining whether a voltage of the signal is between a first threshold voltage and a second threshold voltage (step 404). For example, as described with respect to FIG. 2, the voltage cutoff system determines whether the signal 202 is between the first reference voltage 204 and the second reference voltage 206. As another example, as described with respect to FIG. 3, the voltage cutoff system determines whether the signal is between reference voltage 304 and reference voltage 306.

In some embodiments, the method 400 comprises in accordance with a determination that the voltage of the signal is not between the first threshold voltage and the second threshold voltage, outputting a latched signal to a switch for controlling the battery (step 406). For example, as described with respect to FIG. 2, in accordance with a determination that the signal 202 is not between the first reference voltage 204 and the second reference voltage 206, the OR logic 212 causes the latch 218 to output a latched signal to switch 230. As another example, as described with respect to FIG. 3, in accordance with a determination the signal associated with the battery 302 is not between reference voltage 304 and reference voltage 306, the OR gate 312 causes the latch 318 to output a latched signal to switch 320.

In some embodiments, the switch is coupled to one or more relays for controlling energy provided by the battery. For example, as described with respect to FIG. 3, the switch 320 is coupled to relays 324 and 326.

In some embodiments, the battery is configured to provide energy to a system, and in response to receiving the latched signal, the switch is configured to cause the battery to cease providing energy to the system. For example, in some examples described with respect to FIGS. 2 and 3, in response to receiving the latched signal, the switch 230 or switch 320 is configured to cause the battery to cease providing energy to the system.

In some embodiments, the method 400 comprises receiving an override input, and in response to receiving the latched signal and the override input, the switch is configured to cause the battery to continue providing energy to the system. For example, in some examples described with respect to FIGS. 2 and 3, in response to receiving the latched signal and the override input (e.g., indicating the voltage cutoff system is in override mode), the switch 230 or switch 320 is configured to cause the battery to continue providing energy to the system.

In some embodiments, the method 400 comprises in accordance with a determination that the voltage of the signal is between the first threshold voltage and the second threshold voltage, forgoing outputting the latched signal (step 408). For example, as described with respect to FIG. 2, in accordance with a determination that the signal 202 is between the first reference voltage 204 and the second reference voltage 206 (indicating that the battery is in operating voltage range), a logic low signal is provided to the latch 218, and the latch 218 does not output the latched signal. As another example, as described with respect to FIG. 3, in accordance with a determination the signal associated with the battery 302 is between reference voltage 304 and reference voltage 306 (indicating that the battery is in operating voltage range), a logic low signal is provided to the latch 318, and the latch 318 does not output the latched signal.

In some embodiments, the method 400 comprises receiving a reset signal, and in response to receiving the reset signal, ceasing outputting the latched signal. For example, a latch (e.g., latch 218, latch 318) receives a reset signal (e.g., in response to a startup of the system) and ceases outputting the latched signal in response. In some embodiments, the reset signal comprises a pulse, and the method 400 comprises generating the pulse. For example, as described with respect to FIG. 3, the reset circuit 314 generates a pulse for resetting the latch 318.

In some embodiments, the method 400 comprises adjusting one or more of the first threshold voltage and the second threshold voltage. For example, as described with respect to FIG. 3, the reference voltages 304 and 306 are provided by adjustable voltage regulators, and the value of the reference voltages may be adjusted (e.g., to accommodate a magnitude of the signal received by the comparators).

In some embodiments, the method 400 comprises adjusting the signal associated with the voltage of the battery. For example, as described with respect to FIG. 3, the resistances of the resistor divider may be adjusted to adjust a factor between the battery voltage and the voltage of the signal to the comparators.

In some embodiments, a method, comprises: receiving a signal associated with a voltage of a battery; determining whether a voltage of the signal is between a first threshold voltage and a second threshold voltage; in accordance with a determination that the voltage of the signal is not between the first threshold voltage and the second threshold voltage, outputting a latched signal to a switch for controlling the battery; and in accordance with a determination that the voltage of the signal is between the first threshold voltage and the second threshold voltage, forgoing outputting the latched signal.

In some embodiments, the voltage of the signal is a fraction of the voltage of the battery.

In some embodiments, the fraction is associated with a resistance ratio of a resistor divider.

In some embodiments, the resistor divider comprises resistors having temperature coefficients of 10 ppm/C to 50 ppm/C.

In some embodiments, the resistor divider comprises resistors having resistances of 1 kiloohm to 20 kiloohms.

In some embodiments, the battery is configured to provide energy to a system, and in response to receiving the latched signal, the switch is configured to cause the battery to cease providing energy to the system.

In some embodiments, the method further comprises receiving an override input. The battery is configured to provide energy to a system, and in response to receiving the latched signal and the override input, the switch is configured to cause the battery to continue providing energy to the system.

In some embodiments, the switch is coupled to one or more relays for controlling energy provided by the battery.

In some embodiments, a first relay of the one or more relays is configured to discharge the battery, and a second relay of the one or more relays is configured to charge the battery.

In some embodiments, the switch comprises a CAM switch.

In some embodiments, a state of health of the battery is 30% to 95%.

In some embodiments, the method further comprises: receiving a reset signal; and in response to receiving the reset signal, ceasing outputting the latched signal.

In some embodiments, the battery is configured to provide energy to a system, and the reset signal is generated in response to a startup of the system.

In some embodiments, the reset signal comprises a pulse, and the method further comprises generating the pulse.

In some embodiments, the method further comprises adjusting one or more of the first threshold voltage and the second threshold voltage.

In some embodiments, the method further comprises adjusting the signal associated with the voltage of the battery.

In some embodiments, a system comprises: a first comparator associated with a first threshold voltage, wherein a negative terminal of the first comparator is configured to receive a signal associated with a voltage of a battery; a second comparator associated with a second threshold voltage. A positive terminal of the second comparator is configured to receive the signal associated with the voltage of the battery, and the first threshold voltage is lower than the second threshold voltage. The system further comprises an OR gate configured to receive an output of the first comparator and an output of the second comparator; a latch comprising a first input and a second input. The first input is configured to receive an output of the OR gate, and the second input is configured to receive an output of a reset circuit. The system further comprises a switch coupled to an output of the latch.

In some embodiments, the latch comprises an SR latch, the first input comprises a set input of the SR latch, and the second input comprises a reset input of the SR latch.

In some embodiments, the system further comprises a resistor divider coupled to the battery for generating the signal associated with the voltage of the battery.

In some embodiments, the resistor divider is configurable to adjust the signal associated with the voltage of the battery.

In some embodiments, the resistor divider comprises resistors having temperature coefficients of 10 ppm/C to 50 ppm/C.

In some embodiments, the resistor divider comprises resistors having resistances of 1 kiloohm to 20 kiloohms.

In some embodiments, the system further comprises: a first adjustable voltage regulator coupled to a positive terminal of the first comparator, wherein the first voltage regulator is associated with the first threshold voltage, and a second adjustable voltage regulator coupled to a negative terminal of the second comparator, wherein the second voltage regulator is associated with the second threshold voltage.

In some embodiments, in accordance with a determination that the voltage of the signal is not between the first threshold voltage and the second threshold voltage, the OR gate is configured to cause the latch to output a latched signal to the switch.

In some embodiments, the battery is configured to provide energy to a system, and in response to receiving the latched signal, the switch is configured to cause the battery to cease providing energy to the system.

In some embodiments, the system is configured to receive an override input, the battery is configured to provide energy to the system, and in response to receiving the latched signal and the override input, the switch is configured to cause the battery to continue providing energy to the system.

In some embodiments, the system further comprises one or more relays for controlling energy provided by the battery, wherein the switch is coupled to the one or more relays.

In some embodiments, a first relay of the one or more relays is configured to discharge the battery, and a second relay of the one or more relays is configured to charge the battery.

In some embodiments, the switch comprises a CAM switch.

In some embodiments, a state of health of the battery is 30% to 95%.

In some embodiments, the latch is configured to output a latched signal, and the reset circuit is configured to output a reset signal to the latch, wherein in response to receiving the reset signal, the latch is configured to cease outputting the latched signal.

In some embodiments, the battery is configured to provide energy to a system, and the reset signal is generated in response to a startup of the system.

In some embodiments, the reset signal comprises a pulse.

In some embodiments, the reset circuit comprises a RC circuit for generating a reset signal, and a width of the reset signal is associated with a RC time constant of the RC circuit.

In some embodiments, the first comparator, the second comparator, the OR gate, the latch, and the switch are mounted on a printed circuit board.

Those skilled in the art will recognize that the systems described herein are representative, and deviations from the explicitly disclosed embodiments are within the scope of the disclosure. For example, as an alternative to a CAM swich, a multiplexer may be used to select, e.g., the different relays. As another example, as an alternative to using two NOR gates to build an OR gate, the OR gate may comprise a NOR gate and an inverter. As another example, as an alternative to two comparators, a different circuit may be used to determine whether the battery voltage is out of an operating range. As another example, as an alternative to an RC circuit and a comparator, a different reset circuit may be used to self-generate a reset signal. As another example, as an alternative to the resistor divider, a programmable resistor network may be used to generate the signal associated with the battery voltage. As another example, as alternative to the SR latch, a different latch may be used to generate the latched signal.

Although "electrically coupled" and "coupled" are used to describe the electrical connections between two elements of a circuit in this disclosure, it should be appreciated that the electrical connections do not necessarily need direct connection between the terminals of the components being coupled together. Different combinations and connections of the recited components can achieve the disclosed voltage cutoff operations without departing from the scope of this disclosure. For example, electrical routing connects between the terminals of the components being electrically coupled together. In another example, a closed (conducting) switch is connected between the terminals of the components being coupled together. In yet another example, additional elements connect between the terminals of the components being coupled together without affecting the system's operation. For example, buffers, amplifiers, and passive circuit elements can be added without affecting the operation of the system and departing from the scope of this disclosure.

Although the disclosed embodiments have been fully described with reference to the accompanying drawings, it is to be noted that various changes and modifications will become apparent to those skilled in the art. Such changes and modifications are to be understood as being included within the scope of the disclosed embodiments as defined by the appended claims.

The terminology used in the description of the various described embodiments herein is for the purpose of describing particular embodiments only and is not intended to be limiting. As used in the description of the various described embodiments and the appended claims, the singular forms "a", "an," and "the" are intended to include the plural forms as well, unless the context clearly indicates otherwise. It will also be understood that the term "and/or" as used herein refers to and encompasses any and all possible combinations of one or more of the associated listed items. It will be further understood that the terms "includes," "including," "comprises," and/or "comprising," when used in this specification, specify the presence of stated features, integers, steps, operations, elements, and/or components, but do not preclude the presence or addition of one or more other features, integers, steps, operations, elements, components, and/or groups thereof.

The invention claimed is:

1. A method, comprising:
   receiving, via a negative terminal of a first comparator and a positive terminal of a second comparator, a signal associated with a voltage of a battery, wherein:
   the first comparator is associated with a first threshold voltage, the second comparator is associated with a second threshold voltage, and
the first threshold voltage is lower than the second threshold voltage;
determining, via the first comparator, the second comparator, and an OR gate, whether a voltage of the signal is between the first threshold voltage and the second threshold voltage, wherein the determining whether the voltage of the signal is between the first threshold voltage and the second threshold voltage comprises receiving, via the OR gate, an output of the first comparator and an output of the second comparator;
receiving, via a first input of a latch, an output of the OR gate;
receiving, via a second input of the latch, an output of a reset circuit; and
in accordance with a determination that the voltage of the signal is not between the first threshold voltage and the second threshold voltage, outputting, via the latch, a latched signal to a switch for controlling the battery, wherein the switch is coupled to an output of the latch; and
in accordance with a determination that the voltage of the signal is between the first threshold voltage and the second threshold voltage, forgoing outputting, via the latch, the latched signal.

2. The method of claim 1, wherein the voltage of the signal is a fraction of the voltage of the battery.

3. The method of claim 2, wherein the fraction is associated with a resistance ratio of a resistor divider.

4. The method of claim 1, wherein:
the battery is configured to provide energy to a system, and
in response to receiving the latched signal, the switch is configured to cause the battery to cease providing energy to the system.

5. The method of claim 1, further comprising receiving an override input, wherein:
the battery is configured to provide energy to a system, and
in response to receiving the latched signal and the override input, the switch is configured to cause the battery to continue providing energy to the system.

6. The method of claim 1, further comprising:
receiving a reset signal; and
in response to receiving the reset signal, ceasing outputting the latched signal.

7. The method of claim 6, wherein:
the battery is configured to provide energy to a system, and
the reset signal is generated in response to a startup of the system.

8. The method of claim 1, further comprising adjusting one or more of the first threshold voltage and the second threshold voltage.

9. The method of claim 1, further comprising adjusting the signal associated with the voltage of the battery.

10. A system, comprising:
a first comparator associated with a first threshold voltage, wherein a negative terminal of the first comparator is configured to receive a signal associated with a voltage of a battery;
a second comparator associated with a second threshold voltage, wherein:
a positive terminal of the second comparator is configured to receive the signal associated with the voltage of the battery, and
the first threshold voltage is lower than the second threshold voltage;
an OR gate configured to receive an output of the first comparator and an output of the second comparator;
a latch comprising a first input and a second input, wherein:
the first input is configured to receive an output of the OR gate, and
the second input is configured to receive an output of a reset circuit; and
a switch coupled to an output of the latch.

11. The system of claim 10, wherein:
the latch comprises an SR latch,
the first input comprises a set input of the SR latch, and
the second input comprises a reset input of the SR latch.

12. The system of claim 10, further comprising a resistor divider coupled to the battery for generating the signal associated with the voltage of the battery.

13. The system of claim 12, wherein the resistor divider is configurable to adjust the signal associated with the voltage of the battery.

14. The system of claim 12, wherein the resistor divider comprises resistors having temperature coefficients of 10 ppm/C to 50 ppm/C.

15. The system of claim 10, further comprising:
a first adjustable voltage regulator coupled to a positive terminal of the first comparator, wherein the first voltage regulator is associated with the first threshold voltage, and
a second adjustable voltage regulator coupled to a negative terminal of the second comparator, wherein the second voltage regulator is associated with the second threshold voltage.

16. The system of claim 10, wherein:
the system is configured to receive an override input,
the battery is configured to provide energy to the system, and
in response to receiving a latched signal from the output of the latch and the override input, the switch is configured to cause the battery to continue providing energy to the system.

17. The system of claim 10, further comprising one or more relays for controlling energy provided by the battery, wherein the switch is coupled to the one or more relays.

18. The system of claim 10, wherein the switch comprises a CAM switch.

19. The system of claim 10, wherein the reset circuit comprises a RC circuit for generating a reset signal, and a width of the reset signal is associated with a RC time constant of the RC circuit.

20. The system of claim 10, wherein the first comparator, the second comparator, the OR gate, the latch, and the switch are mounted on a printed circuit board.

* * * * *